B. CHAMBERS.
CANNON.
No. 6,612. Patented July 31, 1849.
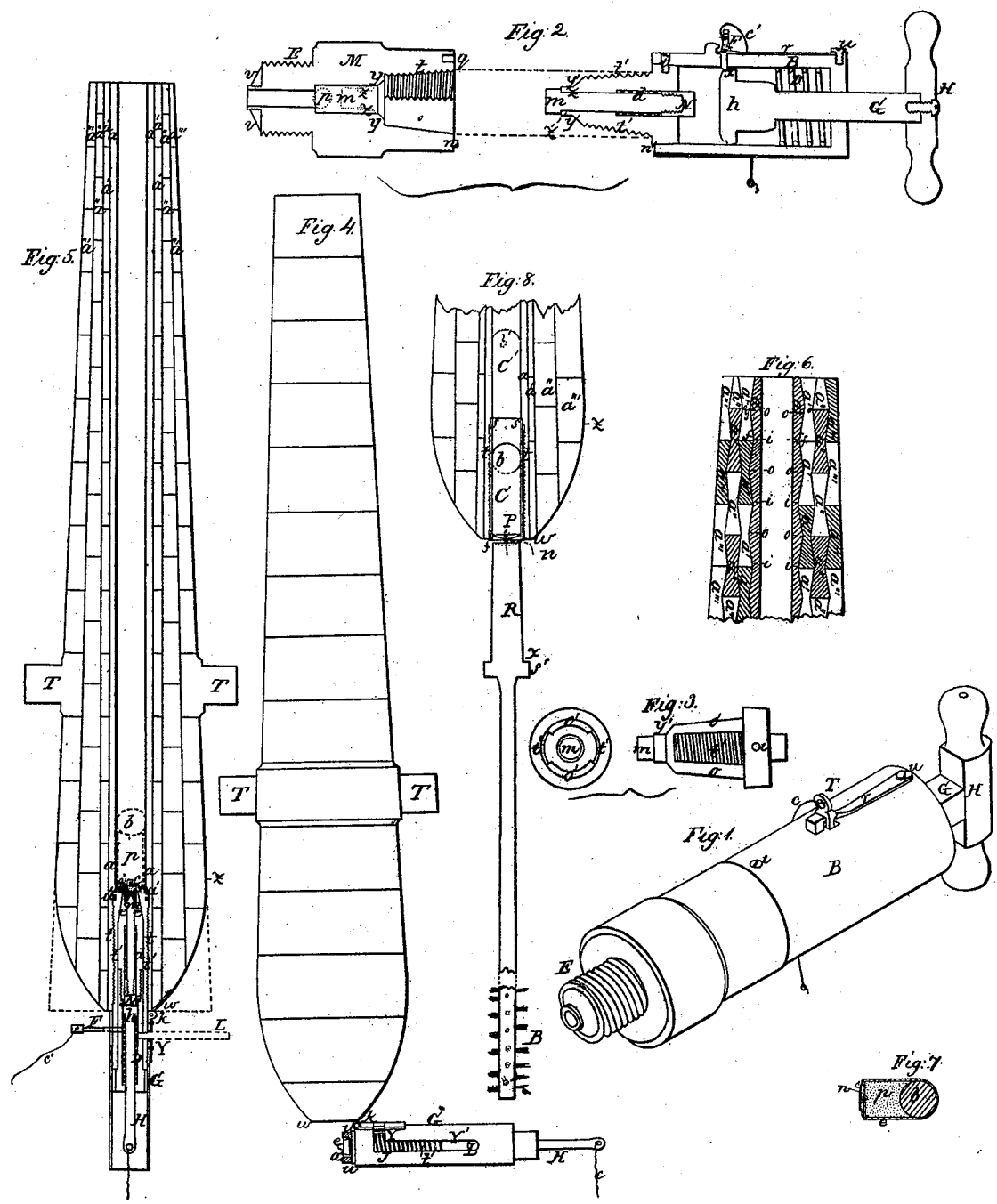

UNITED STATES PATENT OFFICE.

BENJ. CHAMBERS, OF WASHINGTON, DISTRICT OF COLUMBIA.

IMPROVEMENT IN MOVABLE BREECHES FOR FIRE-ARMS AND THE LOCKS AND APPURTENANCES OF THE SAME.

Specification forming part of Letters Patent No. 6,612, dated July 31, 1849.

*To all whom it may concern:*

Be it known that I, BENJAMIN CHAMBERS, of the city and county of Washington, in the District of Columbia, have invented a new and useful Improved Cannon; and I do hereby declare that the following is a full, clear, and exact description thereof, reference being had to the accompanying drawings, which make part of this specification.

My improvements have reference as well to the construction as to the mode of using cannon, the object being to produce such an improvement in fire-arms as will secure all the strength necessary, together with suitable weight of metal and a prompt, safe, and easy mode of charging and discharging the piece.

The material of my cannon is wrought-iron. I am aware that this material has been already employed in various ways for the purpose of constructing heavy ordnance; that staves of iron and hoops of the same material have been put together in alternate layers until a cylindrical or conical mass of suitable magnitude had been produced; that solid masses have been forged and subsequently bored out to the required interior size; that series of rings have been piled up and held together with bolts passing through them lengthwise of the gun, and fastened at each end by screw-nuts, or with straps running fore and aft on the outside; also, that flat rings have been made separately and welded together into a pile of sufficient height to constitute the length of the gun. I am aware that serious objections have in practice been found to exist against all these modes of forming wrought-iron cannon, and I have devised the following, which I consider decidedly preferable to any hitherto in use.

To obviate the danger of crystallizing the iron by welding it in large masses, I form my cannon of pieces of a moderate thickness only, commencing with the tube *a a*, as seen in section at Figs. 5, 6, and 8, the interior of which tube is the bore of the gun, and the outside is turned to receive a series of rings. *a' a'*, &c., which have an interior diameter such that they will not, when cold, pass onto the tube *a*, but when heated will readily slip on and come to the required position. I avoid too great a heat, for the purpose of preventing oxidation of the rings, and determine the diameter of the interior of the rings as compared with that of the exterior of the tube on the principle of the law of expansion of wrought-iron, which I compute at about seven-millionths parts of its dimensions for every degree Fahrenheit to which it is heated above the freezing-point of water. Having shrunk the rings *a' a'*, Fig. 5, upon the barrel *a*, I place in a similar manner, by heating and shrinking on, the rings *a'' a''*, so as to break joints with the rings *a' a'*, and when a greater number of courses of rings is necessary they are placed on the preceding series in the same manner as the second series is placed upon the first—that is, so as to break joints with each other. The rings may all be prepared separately and finished ready to be put together; or, when one set has been placed upon the barrel *a* throughout its length, the piece thus formed may be placed in a lathe, and the exteriors of the rings turned all together, so as to receive the next tier of rings.

Instead of turning the barrel *a* (Figs. 5 and 8) of a cylindrical form and shrinking on the rings *a' a''*, &c., with so much tension as to make them adhere firmly by the mere friction thereby created, I shall in some cases, either in whole or in part, turn the barrel *a*, as represented in Fig. 4, having alternately elevated portions *o o* and depressed portions *i i*. To fit these elevations and depressions, the rings *a' a'* will be formed on their inner sides with reverse depressions and elevations answering to the ridges and cavities turned on *a*. The edge *f* of the ring *a'* is of such interior diameter that it will not, when cold, pass over the ridge *o* on the barrel *a*; but when heated to the proper temperature it will come into place, and then the contraction of metal brought into firm contact with *i*, and *g* into contact with *o*, leaving the barrel at all parts firmly griped by the rings, but not so straining the latter as to diminish essentially the tenacity of the ring when cold. In deciding how high the elevations may be made consistently with ease in getting on rings, and with due adhesion after they are cooled, I calculate the expansion at the temperature used in putting on the rings, and ascertain and give to the diameters at *o* and at *i* the same relations as the ring *a'* will have at the edge *f* in its hot and its cold state, respectively; but in turning the rings $a'$, I leave their interior diameters in the respective parts slightly less than that of the barrel at the parts on which they are severally to be set. This is for the purpose of having every part of the ring when cold brought into a moderate tension, but not overstrained. By means of the rate above stated for the expansion of iron by heat, and assuming the temperature of 1,000° above the freezing-point at which the rings might be able to pass onto the barrel, I find that if the ring has at its edge $f$ a diameter of six inches when cold, its diameter at $g$ (and that of the barrel at $o$) may be made $\frac{7}{1000000} \times 1,000 \times 6 = \frac{42}{1000}$ of an inch more in diameter than at $i$; or it may be 6.042 inches in diameter. As successive rings are put on, the relative diameters at the depressed and at the elevated parts of the interior and of the exterior rings will remain the same as above; but the absolute heights of the ridges over which the edges of the rings must pass will increase in proportion as the diameter increases. The exterior peripheries of all the series of rings, except the last, have depressions $o'$ turned on their middle parts, which depressions are to receive the ends of the next series of rings $a''$. The last series ($a'''$, Fig. 4) will be turned off to the regular conical form of the finished cannon. The trunnions T T, Fig. 5, are forged with one of the outside rings, which, for the purpose of strengthening the connection, may be made thicker than the other exterior rings.

It is not necessary that all the rings composing a cannon should be made of the same diameter for the same series; but they may increase gradually from the muzzle toward the breech end of the cannon, as represented in Figs. 4, 5, and 6.

The portion of my cannon near the breech is tapered to a greater extent than has been generally customary, this part being represented in Figs. 4, 5, and 8 by the curved line $z w$. The firing of the cartridge is made to take place at $c$, Fig. 5, about opposite to the point $z$, and where the diameter of the gun is greatest.

My cannon is so constructed as to be opened and loaded at the breech. For this purpose from the rear end of the gun, at $w$, is cut, in the interior of the barrel $a$, a thread of screw $t$, Fig. 5, in order to receive the male screw $t'$, Figs. 4 and 5. Within the breech-piece, on which is cut the thread $t'$, is contained the lock of the cannon. The manner of cutting away the screws is more fully seen at $t$ and $t'$, Figs. 2 and 3.

The manner in which the breech piece and lock are withdrawn for the purpose of charging the cannon is seen at G, Fig. 4, where $k$ is a hinge about which G, the barrel containing the breech-piece and lock, vibrates horizontally when $t'$ has been drawn backward by the cord $c$ and handle H of the hammer $h$, or by turning the lever L, Fig. 4, from a horizontal to a vertical position, and pushing it back to the place L near Y. In order that this pushing back of L may be possible, the female screw $t t$, Fig. 5, is about one-half cut away within the barrel $a$, being removed longitudinally, on alternate portions of the periphery, as the same is exhibited at $o$, Fig. 2, while in the other two alternate quarters the thread is left as at $t$ in the same figure. To the vacant space $o'$, Fig. 3, corresponds the full thread $t$, Fig. 2, and to the vacant space $o$, Fig. 2, the full thread $t'$, Fig. 3. By this arrangement of the threads the male screw on the breech-piece slides with its remaining sections of threads between the remaining sections of threads of the female screw until the conical part $u$ of the breech-piece, Fig. 4, comes into contact with the seat $u'$, Fig. 5. This sliding is effected by pushing forward the lever L in the slot J until it comes to the vertical or cross slot Y, when, by a partial turn to the right, as seen at L, Fig. 5, the threads of the male screw take into those of the female screw, and with accuracy close the chamber of the gun.

The operation of opening the gun to deposit a charge is, first, to turn L up into a vertical position, so that the segments of screw may slide out, draw it backward to the end of the slot J, and then swing G round on the hinge $k$, as above described. In the end of the breech-piece is an opening through which the point $m$ is momentarily thrust forward when struck by the hammer $h$, to strike the fulminating powder in the cap $c$, Figs. 4 and 5, or on the end of the cartridge at $c$, Figs. 7 and 8. The cap is placed on a conical frustum turned in the end of the breech-piece by forming therein a groove, $a'$, Figs. 4 and 5. The plate-cap $c$, attached to the cartridge, Fig. 7, has a nipple, $n$, penetrating the envelope $e$, and this nipple is open at its point. In either of these modifications the essential feature is preserved of igniting the fulminating powder in direct contact with the cartridge, whereby an exceedingly small quantity is made to suffice and all the force which it produces is usefully employed in projecting the missile. By placing the cap $c$ with its nipple $n$ pressed through the covering $e$ of the cartridge the charge of a cannon, composed of the ball $b$, the gunpowder $p$, and the fulminating priming contained in $c$, is all deposited at once within the chamber of the gun, so that the separate operation of priming is dispensed with and time is economized. When the cap is made separate from the cartridge, it is placed in the usual manner upon the conical frustum immediately before swinging G, Fig. 4, round into line with the axis of the gun. The cap $c$ may be so made as to be filled with the percussion-powder in the usual manner, or a pellet of the fulminate may be pressed into the cavity in the nipple at the moment the cap is about to be set upon its frustum of cone.

Fig. 8 represents the manner of placing the charge in the chamber of my cannon. C is the cartridge within a thin cylindrical metallic shell, $s$, of sufficient length to reach from the rear extremity of the gun to point where the forward end of the screw $t$, Fig. 5, terminates, and where the chamber of the gun commences. This shield has an enlargement in the form of a flat ring or flange, $f$, at the rear end, which prevents it from passing beyond the necessary distance into the gun. The cartridge being placed in the shield, the latter is slipped into the breech of the gun. The rammer R, having a shoulder, $s'$, adjusted to arrest its motion when it comes against the flange $f$ of the shield, is then used to push the cartridge through the shield to the position indicated by the dotted figure $C'$. The rammer has near the shoulder $s$ a little enlargement of the cylinder, (seen at $x$,) whereby the shield is made to adhere to the rammer by friction and to be withdrawn from the breech. At the extremity of the rammer K is a projecting point, called a "perforator," which, while pushing the cartridge, penetrates the envelope and opens a direct passage for the nipple $e$, Figs. 4 and 5, to enter. When the plate-cap is attached to the cartridge, however, this point becomes unnecessary, and the end of the rammer is left plain, or may be slightly concave, so as not to press with great force against the cap in the center of the end of the cartridge. When the gun has been discharged, the swab or brush B is inserted at the breech and driven quite through to the muzzle. During this operation also the shield $s$ may be inserted in the breech, so as to defend the screw from any deposit of impurity upon the threads of screw $t$, Fig. 5.

The double-spring barrel-lock, Figs. 1, 2, and 3, may be used in the modification there seen in other cannon besides those which open at the breech. In this case the dissected male and female screw are arranged on the same plan as above described. The touch-hole is enlarged to a certain depth, and a female screw is cut to receive the screw E in the lower end of the percussion-box M. Within this box is the dissected female screw $t$, the valve-seat $y$, and the shoulder for lodging the pellet of percussion-powder $p$. On one side is the projecting stop, $n$, to pass into a corresponding cavity, $n'$, on the barrel B and prevent its being inserted in a wrong position. The letters of reference on this lock correspond to those on similar parts in Fig. 5. When the handle H is drawn back in either lock, so as to compress the screw D and raise the hammer $h$ above the trigger F, the point of the trigger is pressed either by the hand or by a spring, $r$, Fig. 2, into the space below the hammer, which may or may not have a notch, $x$, to receive its point. In Fig. 2, $h$ is seen elevated, or the gun is cocked. In Fig. 5, F is represented as just withdrawn by the cord $c'$ as in the act of discharging the piece.

The dotted lines in M, Fig. 2, represent the position of the hammer $m$ when the barrel B is inserted in its place and ready to act. The vent of the gun is kept closed against the exit of any of the products of explosion by the conical part $v$ resting on a corresponding seat at the bottom of the cavity cut for the screw E, and $y'$ on the barrel B in like manner makes with $y$ a valve-joint similar to that formed in Figs. 4 and 5 by $u$ and $u'$. After each discharge with the lock B, Fig. 2, the giving of a quarter-turn enables the screw $t'$ to be lifted out of M, in order that the latter may receive a fresh pellet, $p$, after which, by inserting B in place and raising H, the lock is ready for a fresh discharge.

I consider the lock Figs. 1, 2, and 3 to be identical in principle and only modified in its application with the lock Figs. 5 and 6. I therefore waive any separate claim for it in this application, as it is in every application my own invention.

I also consider the manner of using my cannon with a cap, C, having a perforated nipple, $n$, Fig. 7, permanently attached to the cartridge, to be but a modification of that manner which applies the cap with a perforated nipple for entering the envelope of the cartridge at the end of the breech-piece, whereby it is brought against the base of the cartridge. I also consider it safe to apply the perforated nipple-cap to the end of the breech-piece, then to the end of the cartridge.

What I claim as new, and desire to secure by Letters Patent, is—

1. Forming the breech of a gun and its breech piece or pin with sectional screws $t$ and $t'$, cut therein for the purpose of speedily opening the breech for swabbing, depositing the load, and readily closing it again when the gun is to be discharged, as herein set forth.

2. In combination with a sectional-screw breech-piece, the hinged support G, the slot Y, and lever L, whereby the said breech-piece is easily moved into and out of plane in closing and opening the gun, for the purposes herein set forth.

3. Forming the gun-lock in such a manner that the hammer-rod and the percussion-rod shall be in separate pieces, lying axially within the same barrel, whereby the coiled mainspring is made to urge the hammer-rod against the head of the percussion-rod to discharge the piece, and the recoil-spring on the percussion-rod is made immediately to draw back and hold the valve, which closes the interior of the lock against access of smoke and gases, as herein set forth.

4. In combination with a gun having a dissected screw-breech, the flanged shield S, through which the cartridge is made to pass into the chamber over the dissected screw without danger of being broken by the ends and edges of the threads, as herein set forth.

5. The perforated point or nipple on the percussion-cap, for penetrating the inclosing material of the cartridge and insuring the discharge of the gunpowder when the percussion is given in the rear of the cartridge, in the manner herein set forth.

6. In combination with a rammer for charging guns at the breech, the projecting central point, $n$, whereby the cartridge, in being driven to its place in the chamber, is perforated at its base to receive the point of the percussion-cap herein described, for the purpose of insuring the ignition of the gunpowder, as set forth.

7. The enlargement $x$ near the shoulder $s$ of the rammer, whereby the shield through which the cartridge has been rammed is made to adhere by friction to the rammer, and to be drawn out of the breech of the gun without requiring a separate operation for taking it out; and I wish it to be understood that in these claims I shall not confine myself to the exact arrangement of parts herein described, but shall vary the same at pleasure, while I attain the same ends by means substantially the same.

B. CHAMBERS.

Witnesses:
G. WELCH,
JOHN DILL.